United States Patent [19]

Weldy et al.

[11] Patent Number: 4,663,661

[45] Date of Patent: May 5, 1987

[54] SINGLE SENSOR COLOR VIDEO CAMERA WITH BLURRING FILTER

[75] Inventors: John A. Weldy, Rochester; Stephen H. Kristy, Fairport, both of N.Y.

[73] Assignee: Eastman Kodak Company, Rochester, N.Y.

[21] Appl. No.: 737,359

[22] Filed: May 23, 1985

[51] Int. Cl.$^4$ .............................................. H04N 9/07
[52] U.S. Cl. ......................................... 358/44; 358/43
[58] Field of Search ....................... 358/37, 41, 43, 44

[56] References Cited

U.S. PATENT DOCUMENTS

| | | | |
|---|---|---|---|
| 3,588,224 | 6/1971 | Pritchard | 350/157 |
| 4,065,785 | 12/1977 | Adcock et al. | 358/44 |
| 4,071,853 | 1/1978 | Yamanaka | 358/44 |
| 4,107,732 | 8/1978 | Adcock et al. | 358/43 |
| 4,148,059 | 4/1979 | Dillon et al. | 358/37 |
| 4,176,373 | 11/1979 | Dillon et al. | 358/37 |
| 4,238,765 | 12/1980 | Nagumo | 358/43 |
| 4,570,178 | 2/1986 | Morimura et al. | 358/41 |

FOREIGN PATENT DOCUMENTS

| | | |
|---|---|---|
| 94676 | 11/1983 | European Pat. Off. . |
| 57-39683 | 3/1982 | Japan . |
| 58-196791 | 11/1983 | Japan . |
| 59-11085 | 1/1984 | Japan . |
| 59-279 | 1/1984 | Japan . |

OTHER PUBLICATIONS

Ogawa et al., "CCD Imaging Block for Color Camera", Feb. 1985, *Technical Reports, Institute of Television Engineers of Japan* (TEBS 101-9ed 844).

Yamanaka et al., "Line Sequential Imaging Method and Signal Processing Method for CCD Color Cameras", Jan. 1980, *Technical Reports, Institute of Television Engineers of Japan* (TEBS 60-1, pp. 19-25).

Nabeyama, H. et al, "All Solid State Color Camera with Single Chip MOS Imager," IEEE Trans. on Consumer Electronics, vol. CE-27, Feb. 19, 1981, pp. 40-46.

Ser. No. 597,290, "Optical Spatial Frequency Filter," filed Apr. 6, 1984.

Ser. No. 648,998, "Single-Chip Solid-State Color Image Sensor," filed Sep. 10, 1984 (continuation Ser. No. 676,910, filed Nov. 30, 1984.)

Ser. No. 649,000, "Single-Chip Electronic Color Camera", filed Sep. 10, 1984.

*Primary Examiner*—James J. Groody
*Assistant Examiner*—Robert M. Bauer
*Attorney, Agent, or Firm*—David M. Woods

[57] ABSTRACT

A single sensor video camera includes an optical blurring filter having a known spatial (or frequency) function and a color filter interposed between the blurring filter and an image sensor. The color filter has red and blue filter elements intermingled among a majority of green elements. An accurate estimate of the blurred green light blocked by the non-green elements is recovered by applying the image signal from the sensor to a digital filter and substituting the resultant signal for the missing green portions. The coefficients of the filter are selected in an optimization process that seeks to match the known function of the blurring filter to a like function of the digital filter (as represented by the coefficients). To do this the color filter must be configured to provide at least two green samples on either side of a non-green element.

17 Claims, 13 Drawing Figures

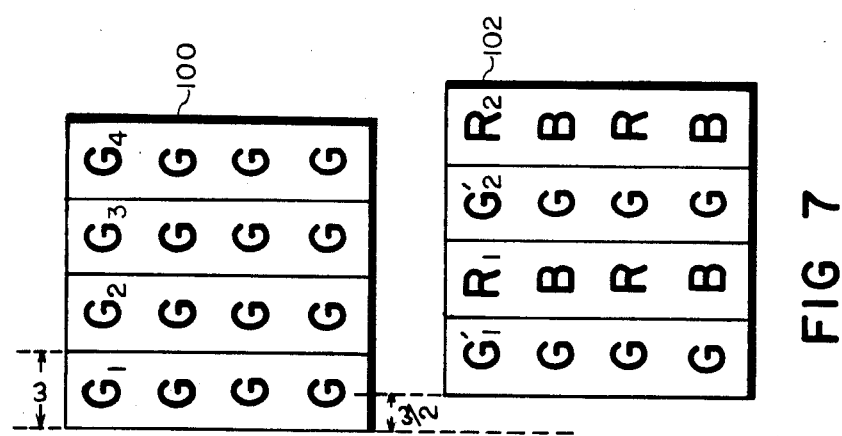

SINGLE SENSOR COLOR VIDEO CAMERA WITH BLURRING FILTER

BACKGROUND OF THE INVENTION

Field of the Invention

This invention relates to a color video camera and in particular to a camera of the type employing a signal processing system that obtains both luminance and color information from a single sensor.

BRIEF DESCRIPTION OF THE DRAWINGS

The invention, as well as the prior art, will be described with references to the figures, wherein

FIG. 4 includes several diagrams of color filter patterns useful according to the invention;

FIG. 7 is a diagram of the color filters for a two sensor system useful according to the invention.

DESCRIPTION RELATIVE TO THE PRIOR ART

An accurate video reconstruction of a color scene requires the estimation of the luminance and the color content of every area of the scene. One way to do this is to measure the luminance and color content of every area with separate sensors. Since luminance may be computed from the primary colors, greatest accuracy is obtained by sensing the red, green and blue information with three separate sensors.

Figures 1, 2:
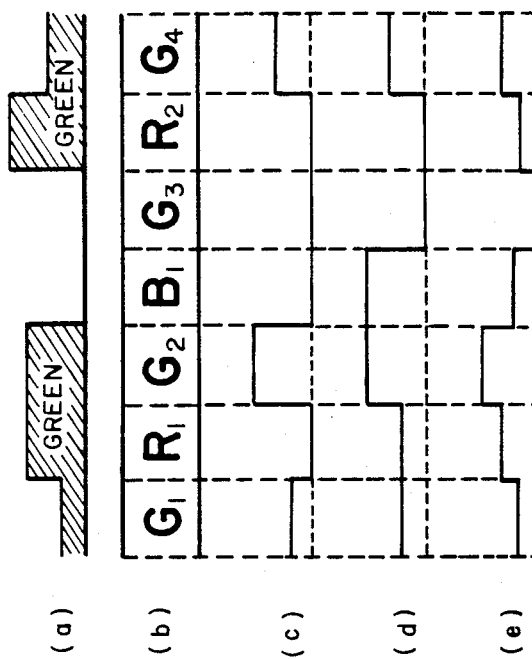
FIG. 1 is an example of a known arrangement of color filter elements constituting part of a filter used with a single sensor video camera.
FIG. 2 is a diagram showing a line portion of the filter shown by FIG. 1 and several waveforms of a green signal generated by use of the filter and by use of several known processing techniques.

Small, lightweight and inexpensive cameras, however, try to get by with just one sensor. Since luminance is a combination of color information with a strong bias toward green, it is ordinarily based on just the green information provided by the sensor. The color content is ordinarily based on differences between the luminance (i.e., green information) and other primary colors (i.e., red and blue information). Each separate color is isolated by passing the scene light through a color filter before it strikes the sensor. A striped filter, such as the known filter shown in part by FIG. 1, is representative of the type of filter used in a single sensor camera. The green information (luminance) is sampled twice as frequently as red and blue information because it contributes more significantly to image resolution.

As may be appreciated by examining the filter pattern of FIG. 1, information corresponding to all three primary colors, red, green and blue, is not measured for each discrete area of the scene. Information from neighboring discrete areas must be used in order to generate luminance and color differences for each discrete area of the scene. The resulting lack of color information from each discrete area of the scene constitutes one of the most severe problems with a single sensor camera. The problem is especially severe with the luminance (green information) since it contributes most to image resolution. Color differences, in addition, involve green information (red-green, blue-green) and should be calculated with respect to coinciding red (or blue) and green colors. If the green information does not coincide with the color with which it is being differenced, color artifacts ordinarily appear.

Samples of green information thus are critical for an accurate reproduction but are only available from some of the discrete picture areas. The nearest green sample(s) is ordinarily borrowed and used for the sensed picture element (pixel) without green information: FIG. 2(a) shows areas of an exemplary green scene useful in illustrating the color coincidence problem. FIG. 2(b) shows a partial line section of the striped filter shown by FIG. 1. Red or blue filter elements are intermingled among green filter elements. FIG. 2(c) shows a green signal waveform produced by sampling the green signal pixel-by-pixel with a sensor covered by the filter of FIG. 2(b). As would be expected, green scene information juxtaposed over non-green filter elements does not register for the corresponding pixel. One way of extending the green signal, as shown by FIG. 2(d), is to hold each green sample through the duration of a neighboring pixel (this technique is often described as "box-car" processing; see for example, the sample and hold circuitry used for this purpose in U.S. Pat. No. 4,148,059).

"Box-car" processing is an inadequate technique in many instances: note, for example, that such processing completely misses the green scene information juxtaposed over the filter element $R_2$. Another, and sometimes better, technique is shown by FIG. 2(e). The green scene information overlying the red and blue filter elements is estimated by interpolating from the two adjoining green samples (see, for example, interpolating schemes shown in U.S. Pat. No. 4,065,785). A simple average provides an estimate of the missing green information (e.g., the green information juxtaposed over the $R_1$ filter element is estimated to be $\frac{1}{2}(G_1+G_2)$). Such interpolation, however, assumes a regularity in green information from pixel to pixel. This is not always true: note, for example, that simple interpolation incorrectly assigns green information to the (non-green) scene area overlying the filter element $B_1$.

Neither simple interpolation nor "box-car" processing assure that green scene information will either accurately represent missing green information or coincide with red or blue scene information. Though unfortunate, the reason seems unassailable: true green cannot be assigned to an area from which no green information is obtained.

SUMMARY OF THE INVENTION

It is possible to recover a better estimation of missing green information of a scene by spreading the missing green light over nearby filter elements corresponding to nearby pixels. An optical blurring filter placed between the scene and the color filter will do this nicely. By itself, however, this is not enough. Since the missing green light is blurred into, and mixed with, the green light from nearby scene areas, it is very difficult to extract (by simple interpolation) only that green contribution due to the missing green light.

This invention involves the combination of a known blurring filter having a known response function and a special electrical filter for processing the electrical signals derived from an image sensor receiving the blurred light. By matching the electrical filter to the known response function, the signal obtained is representative of the missing green light. The scene, consequently, is reconstructed with improved color coincidence.

The known response function of the blurring filter may be characterized either in frequency terms or in spatial terms. In spatial terms, the function is commonly known as a spread function. In order to match the electrical filter to the spread function of the blurring filter, the electrical filter is configured as a digital filter (a finite impulse response (FIR) filter, for example) that acts on a string of image samples. The samples are taken for at least two pixels on either side of the pixel missing green light, and preferably from three pixels on either side (a total of six samples). The weighting coefficients of the digital filter are so selected that if they are convolved with the spread function of the blurring filter the result is a close approximation of the same spread function, that is, of the blurring filter. The effect of this convolution is to prescribe a specific range of coefficients for the digital filter. With these coefficients applied to the green samples, the influence of the digital filter on the image signals emerging from the sensor imitates the influence of the blurring filter upon the scene. What then comes from the digital filter is a close approximation of what comes from the blurring filter: Importantly, information regarding the missing green light is present in both cases.

The selection criteria for the weighting coefficients can also be characterized in frequency terms. The weighting coefficients define a certain frequency response for the digital filter. The coefficients are so selected that if the frequency response of the digital filter is multiplied with the frequency response of the blurring filter, the result is a close approximation of the frequency response of the blurring filter.

DETAILED DESCRIPTION OF THE PREFERRED EMBODIMENT

Because video cameras, image sensors, optical and digital filters and the like are well-known, the present description will be directed in particular to elements forming part of, or cooperating more directly with, apparatus in accordance with the present invention. Elements not specifically shown or described may be selected from those known in the art.

Figure 3:
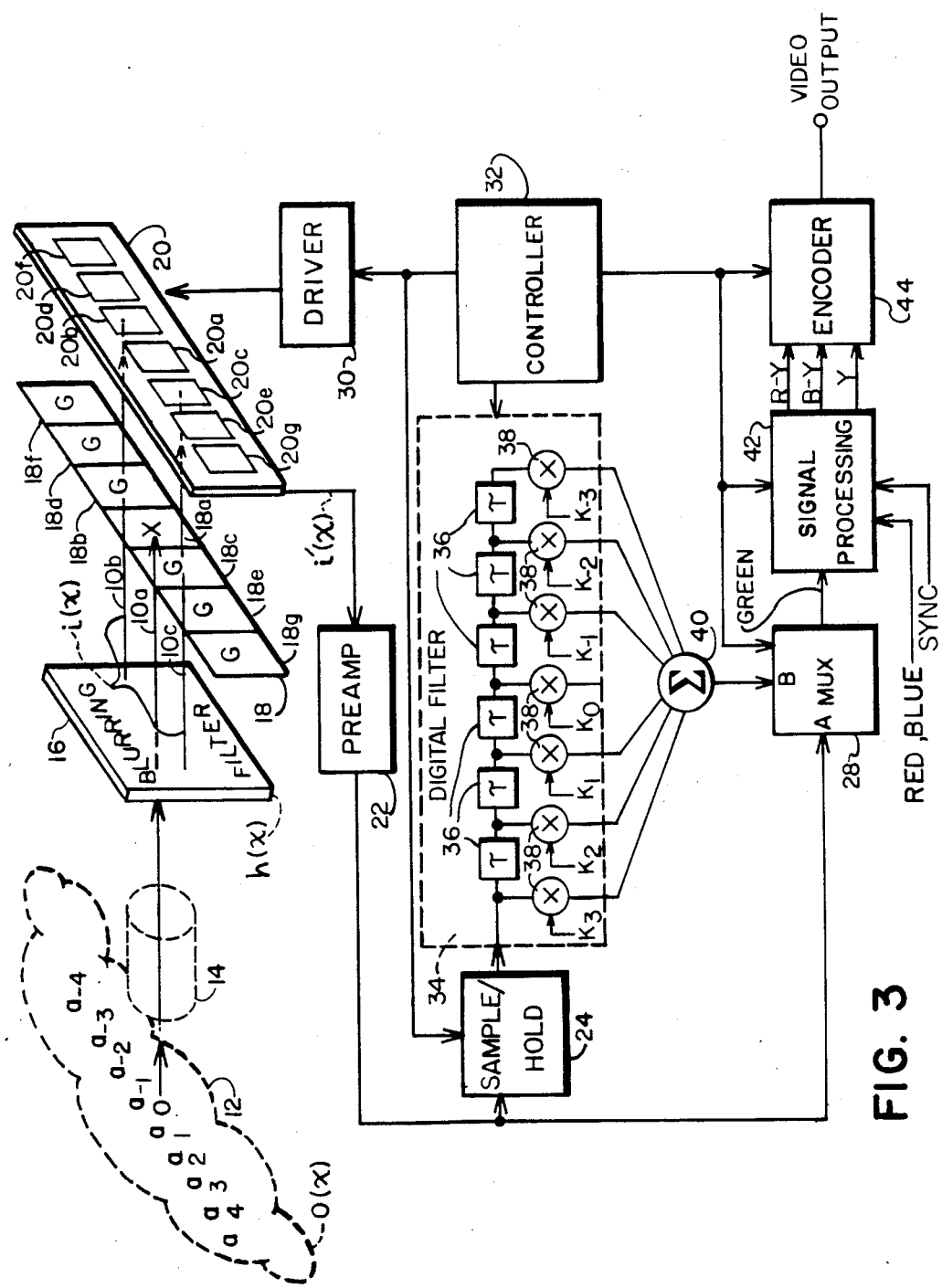
FIG. 3 is a block diagram showing a single sensor color camera employing a blurring filter and a digital filter according to the invention.

Referring now to FIG. 3, the pertinent components of a single sensor video camera are shown. The relationship of these components is simplified by describing a particular ray of green light 10 emanating from an area $a_0$ of a scene object 12. The green light will hereinafter be treated as luminance; the green-to-luminance match may in practice be accurately rendered by employing a wide-band green filter that passes some red and blue light in addition to green. The green light content of the ray 10 is of special interest since its value is necessary to obtain accurate luminance information and therefore color coincidence with red and blue samples spatially coinciding with the ray 10. (It should be understood, however, that the practice of the invention involves a plurality of rays emanating from various discrete areas of a multi-dimensional object.) The green light ray 10 passes through a focusing lens 14 and strikes a blurring filter 16. (The lens 14 is shown by broken line because its effect on the light is not being considered in detail in this description). The blurring filter is of a type (to be described later) which spreads each incoming light ray over three filter elements of a color filter 18.

In terms of the single ray 10, the light is separated into an undeflected green ray 10a that strikes a non-green filter element 18a (either red or blue, for example) and deflected rays 10b and 10c that strike green filter elements 18b and 18c on either side of the non-green element 18a. Four additional filter elements 18d . . . 18g are arranged outboard of the three elements described so far; these additional elements also play a part according to the invention, but they will be described later. It should be understood that the color filter 18 represents one small portion of a whole filter. The pattern of three green elements on either side of a non-green element is repeated many times line after line (as shown, for example, by FIG. 4(d)).

The brightness distribution of the light striking the color filter 18 depends upon the brightness distribution of the scene light—characterized by a spatial function o(x)—and upon the effect of the blurring filter 16 on the scene light—characterized by a filter spread function h(x). It is well-known that the brightness distribution of the light—characterized as i(x)—on the color filter 18 can be described as the convolution of the scene function with the filter function, that is $$i(x) = o(x) * h(x)$$

(where the symbol * represent the process of convolution; other factors, that would normally be considered such as the transfer function of the lens 14, are being ignored to simplify this explanation).

Light passing through the color filter elements 18b and 18c strikes photosensitive sites 20b and 20c of a segment of an image sensor 20 (which is part of a much larger one- or two-dimensional array, such as a charge-coupled device (CCD) or any other kind of conventional sensor). While the above simple convolution described the brightness distribution on the face of the filter 18, it no longer describes the brightness distribution on the photosensitive sites. This is so because the non-green element 18a prevents the center ray 10a from reaching a corresponding photosensitive site 20a of the sensor 20. The object of subsequent processing is to simulate, as closely as possible, the green brightness distribution of the light ray 10 as it strikes the filter 18—in particular, to simulate the distribution represented by the light rays 10a, 10b and 10c. If the brightness of these rays can be measured or estimated, that result may be used for the green scene content of the light ray 10—including the missing green information at the site 20a. Then color coincidence regarding the red (or blue) information from the scene area $a_0$ is obtained.

Considering next the outboard green filter elements 18d and e and 18f and g, it may be appreciated that green light passing through such elements strikes photosensitive sites 20d and e and 20f and g of the sensor 20. Such light originates from other areas of the scene 12 like the areas $a_1, a_2, a_3, a_4$ and the areas $a_{-1}, a_{-2}, a_{-3}, a_{-4}$. This light is also spread by the blurring filter 16 over three adjacent filter elements. For example, light from the area $a_1$ is spread over the filter elements 18a, 18c, and 18e; light from the area $a_2$ over the filter elements 18c, 18e and 18g; and so on. A signal i'(x) recovered from the sensor 20 therefore is a continuous stream of image samples with each sample being influenced by several scene areas (the signal from the photosensitive site 20c is, for example, influenced by light emanating from areas $a_0, a_1$ and $a_2$).

The signal i'(x) recovered from the sensor 20 is amplified by a preamplifier 22 and then delivered to a sample and hold circuit 24 and to a multiplexer 28. A driver 30 clocks the sensor 20 and shifts the image signal to the preamplifier 22. The operation of the driver 30, the sample and hold circuit 24 and the multiplexer 28 is coordinated and directed by a controller 32 (which is ordinarily a programmed processor, such as a microprocessor). Each sample of the image signal is delivered to a digital filter 34, which is composed of a series of delay circuits 36 and a series of coefficient multiplier circuits 38. (The filter 34 is described as digital because it deals with discrete quantities; a finite-impulse-response filter, also called a transversal filter, is the type of filter used in the preferred embodiment.) The outputs from the multiplier circuits 38 are delivered to a summing circuit 40, which delivers its output to the multiplexer 28. The sequence of operations of the digital filter 34 and the multiplexer 28 are coordinated and directed by the controller 32.

The multiplexer 28 operates in two mutually exclusive modes: in one mode it switches the output sum from the summing circuit 40 into the signal stream once for every four samples just as the sample derived from the photosite 20a arrives at the input to the multiplexer 28; in the other mode it switches the signal i'(x) directly through to subsequent stages. When the signal to the multiplexer 28 corresponds in time to the occurrence of a sample derived from the photoside 20a (underlying the non-green filter element 18a) an input A of the multiplexer 28 is opened and an input B is closed. The weighted sum of image signals from the summing circuit 40 is thereby inserted into the signal stream. The multiplexer 28 then reverts to its former condition with the input B opened and the input A closed—until a sample corresponding to the next non-green filter element arrives. In this manner a continuous green signal is produced, formed partially of signals derived from the sensor photosites underlying green filter elements and partially of signals derived from the digital filter 34, which are inserted in place of signals derived from the photosites underlying the non-green filter elements.

The digital filter 34 operates on a stream of seven image samples representing brightness contributions (after blurring) from nine scene areas $a_4 \ldots a_0 \ldots a_{-4}$. The image samples are arrayed for simultaneous treatment by the series of delays 36. At the appropriate moment (determined by the controller 32) the arrayed samples are multiplied by the series of multiplier coefficients $K_3, K_2, K_1, K_0, K_{-1}, K_{-2}, K_{-3}$ and summed in the summing circuit 40. The coefficients correspond to the samples passing through specific elements of the color filter 18, that is, coefficient $K_3$ to the sample derived from light passing through the filter element 18g, $K_2$ to 18e, and so on. Coefficient $K_0$ is ordinarily zero as this coefficient corresponds to the pixel missing green, i.e., the sample derived from light passing through the filter element 18a and striking the photosite 20a.

A key aspect of the invention is the selection of the multiplier coefficients according to the following condition: the convolution of the coefficients $K_3 \ldots K_{-3}$ with the spread function of the blurring filter 16 must yield an approximation of that same spread function (of the blurring filter 16). That is, $$[K_3 K_2 K_1 K_0 K_{-1} K_{-2} K_{-3}] * h(x) = h'(x)$$

where $h'(x)$ is approximately equal to $h(x)$. This is most readily done by convolving a set of numbers representing the spread function with coefficients selected by an optimization program. the optimization program used is referred to as the ENNIPEDE optimization routine. The program statements for the ENNIPEDE optimization routine, which are intended to run on the Digital Equipment Corp. VAX 11/750 computer, are set forth in an Appendix to this specification. The ENNIPEDE routine is a modification of a similar program, called the SPIDER routine, which is likewise capable of providing the optimized coefficients (see "SPIDER, An Optimization Program," Miller, Mathew J., 1979, Masters Thesis, Bucknell University, Lewisburg, PA 17837; available from the Bucknell library). Another program which may be used is the well-known Simplex routine, which is described in texts (e.g., Dantzig, Geoge B. *Linear Programming and Extensions*, Princeton Univ. Press, 1963; and Wilde, Douglas J. and Beightler, Charles S. *Foundation of Optimization*, Prentic Hall, 1967) and commercially available from the International Mathematical and Statistical Librarians, Inc., 7500 Bellaire Boulevard, Houston, Tex. 77036 (as part of the IMSL Library Contents Document, Edition 8). Such programs will minimize the absolute value of the difference between the spread function $h(x)$ and the approximate spread function $h'(x)$ calculated from the above convolution. In reaching this optimization, the program will continuously substitute new multiplier coefficients until an optimum result is achieved. These coefficients are produced as a program output and used for designing the digital filter 34.

One way of viewing the choice of coefficients is as follows. The output (at the summing circuit 40) of the digital filter 34 is a weighted combination of image signals. The coefficients $K_{-3} \ldots K_0 \ldots K_3$ comprise these weightings. The weighted combination of image signals may be analogized to the brightness distribution of light $o(x)$ constituting the scene. In pursuing this analogy, recall that the brightness distribution of light $o(x)$ convolved with the spread function $h(x)$ of the blurring filter 18 is the (blurred) distribution appearing on the face of the color filter 18. This distribution is linearly proportional to the scene distribution and, for a unit scene value, is the spread function itself (i.e., $[a_0 = 1] * h(x) = h(x)$). Similarly, if the weighted combination of image signals convolved with the spread function of the blurring filter 18 yields something approximately proportional to the spread function itself then the weighted combination of image signals from the digital filter 34 represents a reconstruction of that light which strikes the blurring filter 18, namely, a reconstruction including the green content of the scene object. For a unit signal value, this convolution reconstructs an approximation of the spread function itself. This means the full green content of the part of the scene overlying the non-green filter element 18a has been accurately estimated. The result is better color coincidence.

It may seem strange that the weighted combination of image signals involves green samples from the outboard photosites $20d \ldots 20g$, none of which receive any green light from the very ray 10 that is being approximated. Their presence, however, is necessary in order to optimize the convolution of the spread function of the blurring filter with the stream of image signals. In other words, the spread function of the blurring filter cannot be accurately estimated by using only the samples from the photosites 20b and 20c surrounding the photosite 20a missing green. Additional samples have been found necessary if the convolution of the weighting coefficients with the spread function is to regenerate the spread function.

The green signal from the multiplexer 28 is applied to a signal processing network 42 and forms its luminance output. Red and blue signals are also brought into the signal processing network 42 from a separate signal path. Each red (or blue) signal value corresponds to the signal generated by the photosite 20a from red (or blue) light passing through the non-green filter element 18a. In practice, the part of the signal i'(x) that is blocked by the multiplexer 28 in forming the green signal may comprise the red (or blue) signal—which is coupled to the network 42 (by means not shown). Synchronization pulses are added and color difference signals are generated in the signal processing network 42. The color difference signals are improved with regard to color coincidence because the red (or blue) color can now be differenced with an accurate estimate of the green color from the same scene area. The improved color difference signals are extended by conventional "box-car" processing or by simple interpolation (averaging) to cover the pixels corresponding to intervening green filter elements (this procedure is not shown by FIG. 3). The color difference signals (R-Y, B-Y) and the luminance (green) signal (Y) are formulated into a desired signal by an encoder 44 and delivered to a video output port. The purpose of the output forms no part of this invention but could relate, for example, to recording on a tape or a disk or to displaying on a monitor. The encoder may, for example, encode the video signal into NTSC format for display or modulate the signal differences on separate carriers for component recording.

Figure 4:
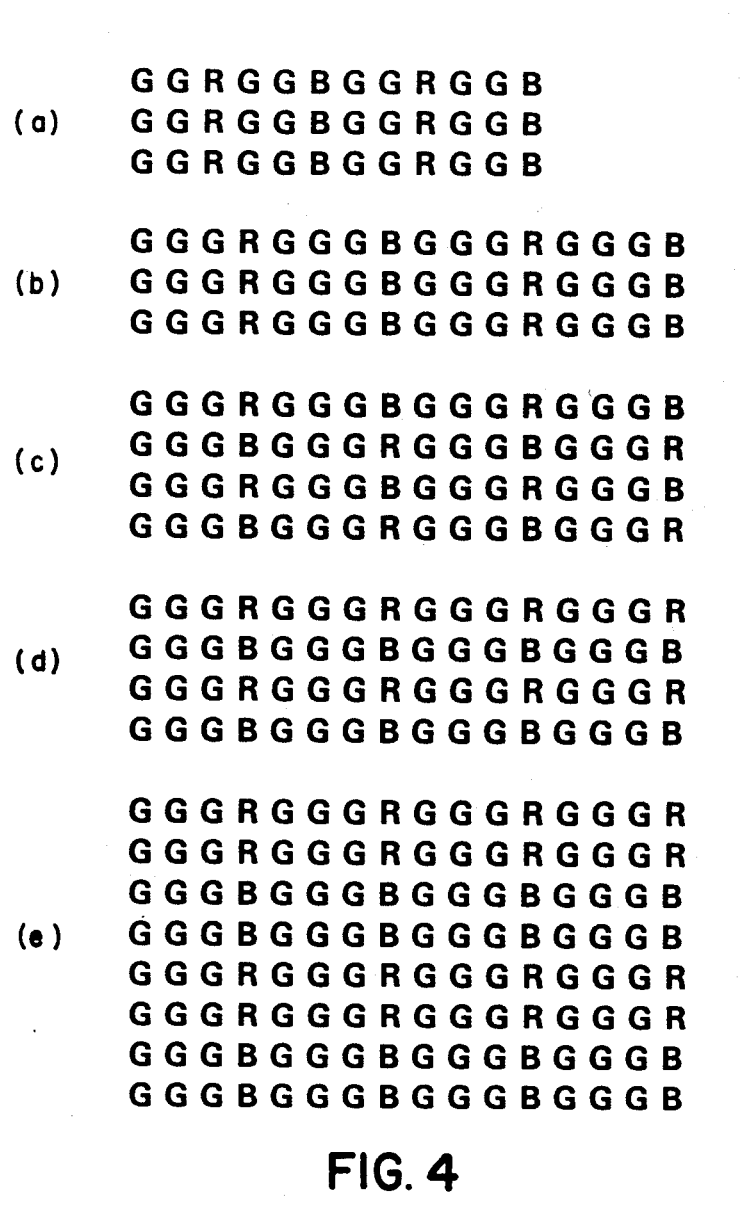
Figure 4:
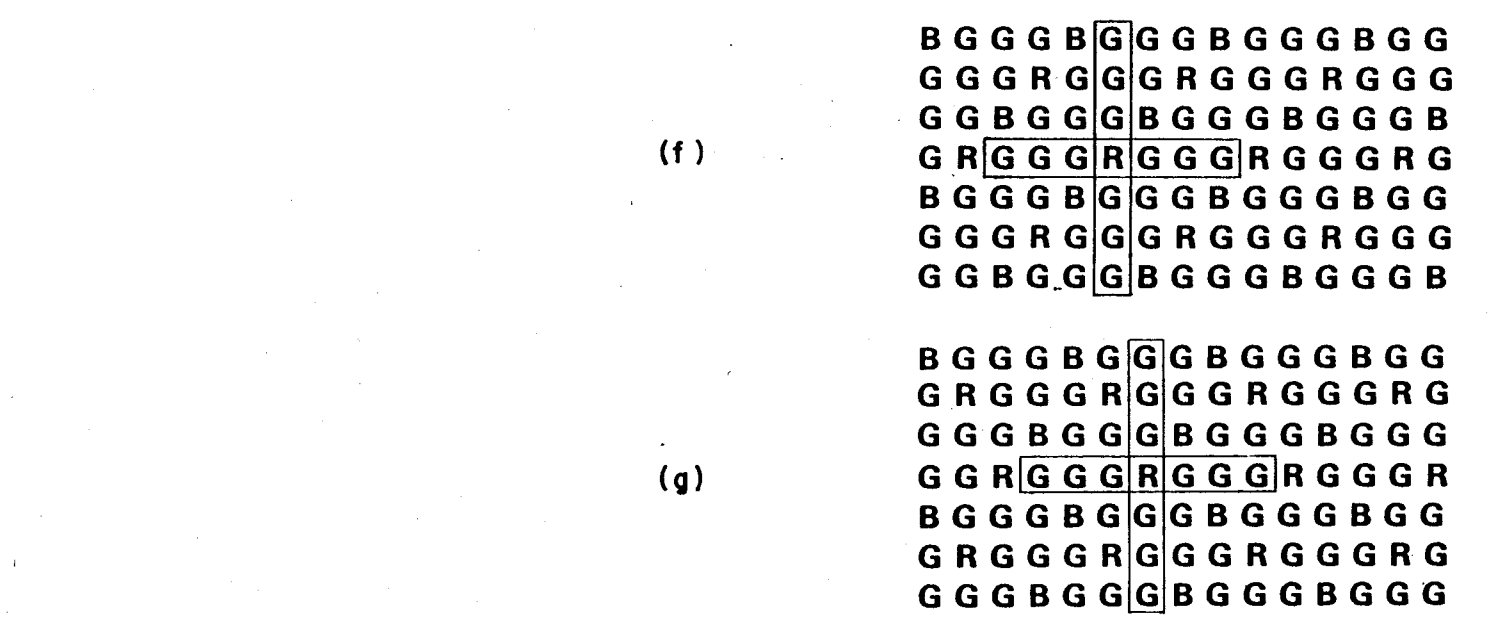

The color filter 18 shown in FIG. 3 is understood to be a segment from a larger, preferably two-dimensional, filter. FIG. 4 shows several configurations for a color filter (which are also understood to be segments from larger filters); in any configuration, it is necessary to have at least two green filter elements on either side of a red or blue element. Color stripe filters having red and blue stripes intermingled between two green elements and three green elements respectively are shown by FIGS. 4(a) and 4(b). The filter configurations shown by FIGS. 4(c) and 4(d) have red and blue elements alternated vertically and separated horizontally by three green elements (FIG. 4(d) is the preferred configuration). FIG. 4(e) shows a variation of the filter of FIG. 4(d) useful for sensing both fields of a television frame. FIGS. 4(f) and 4(g) shows filter configurations having three green filter elements arrayed horizontally and vertically on either side of a red or blue filter element. Each of these filters is useful with a single sensor camera.

Figure 5:
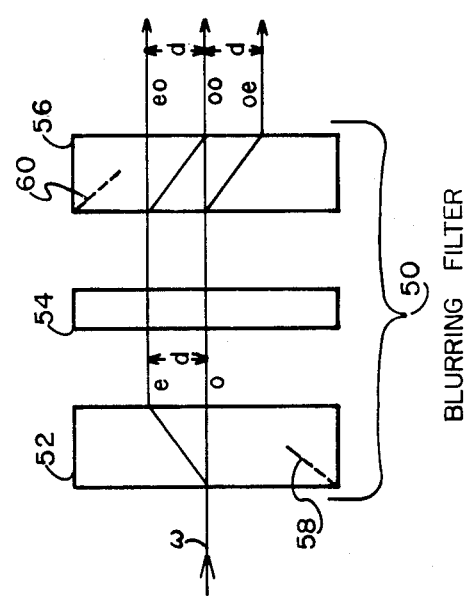
FIG. 5 is a diagram of a birefringent filter suitable for use as the blurring filter shown as part of FIG. 3.

The blurring prefilter may be any type of low pass filter with a known spread function. A preferred filter, however, is a conventional optical filter made from sheets of birefringent material. This type of filter—conventionally known as a birefringent filter—splits an image into two or more slightly displaced images. The effect of such displacement is to blur the input image. As shown in FIG. 5, a birefringent filter 50 includes three elements of birefringent material 52, 54 and 56. (In practice, the three elements may be sandwiched together to form a unitary filter). The first element 52 has an optic axis 58 oriented such that a ray of unpolarized light w is split into an ordinary ray o passing straight through the element and an extraordinary ray e that is displaced in the element by a distance d and emerges from the element parallel to the ordinary ray. As is well known, the two rays represent light having two different polarization states. The plane of polarization for, the ray o is perpendicular to the plane of the drawing (FIG. 5) while that for the ray e coincides with the plane of the drawing.

The second element 54 is a quarter-wave plate and changes the polarization state of light passing through it from linearly polarized to circularly polarized. It does not, however, deflect the rays. The third element 56 is similar to the first element 52 but its optic axis 60 is oriented to displace the extraordinary ray in the opposite direction. The circularly polarized input light, having equal components polarized in the plane of the drawing and perpendicular to the plane of the drawing, is split by the third element 56 into e and o rays. The four rays emerging from the third element 56 are labelled to show their origin—that is, ray eo is the ordinary part of the formerly extraordinary ray emerging from the element 52, ray oe is the extraordinary part of the formerly ordinary ray emerging from the element 52, and so on. Two rays—oo and ee—coincide, thereby increasing the intensity of the central ray relative to the outboard rays. The relative intensitites are controlled by the arrangement of the elements, and the thickness or retardation of the quarter-wave plate. It is this relative intensity distribution that determines the point spread function. In one embodiment according to the invention the birefringent filter is characterized by a spread function of

| | | | |
|---|---|---|---|
| 0.256 | 0.488 | 0.256 | (1) |

These numbers sum to unity and indicate that 48.8% of the light is distributed in the center and 25.6% on either side.

The amount of displacement of the extraordinary ray depends on the indices of refraction of the birefringent material, the angle the optic axis makes with the normal to the surface of the material, and the thickness of the element. These parameters are chosen so that the displacement d between the rays emerging from the birefringent optical filter 50 is equal to the distance between individual photosites 20a ... 20g in the sensor 20. The invention may also be practiced in connection with the use of a color-dependent birefringent filter of the type disclosed in U.S. patent application Ser. No. 597,290, filed on Apr. 6, 1984 in the name of J. E. Greivenkamp (entitled "Optical Spatial Frequency Filter", and assigned to the same assignee as the present application). With such a filter, red and blue light is spread over more elements (e.g., four elements) than green light (e.g., two elements). Then it is possible to tailor the digital filter to one green value for the luminance (green) signal and to another green value for the color difference signals.

The three numbers characterizing the point spread function (1) and a starting set of weighting coefficients, are processed in the ENNIPEDE program. (The program may be used somewhat in reverse by letting it pick a set of spread function numbers that optimally matches a feasible set of weighting coefficients; then a suitable blurring filter may be designed to match the chosen spread function). The program, after optimization is obtained, provides the following coefficients:

$$K_3 = 0.224 \quad (2)$$
$$K_2 = -0.512$$
$$K_1 = 0.788$$
$$K_0 = 0$$
$$K_{-1} = 0.788$$
$$K_{-2} = -0.512$$
$$K_{-3} = 0.224$$

The convolution of these coefficients (2) with the point spread function gives the following result (first line):

| .057 | −0.022 | 0.009 | 0.253 | 0.403 | 0.253 | 0.009 | −0.022 | 0.057 |
|---|---|---|---|---|---|---|---|---|
| 0 | 0 | 0 | 0.256 | 0.488 | 0.256 | 0 | 0 | 0 | which approximates the original point spread function (1) shown by the second line.

Figure 6:
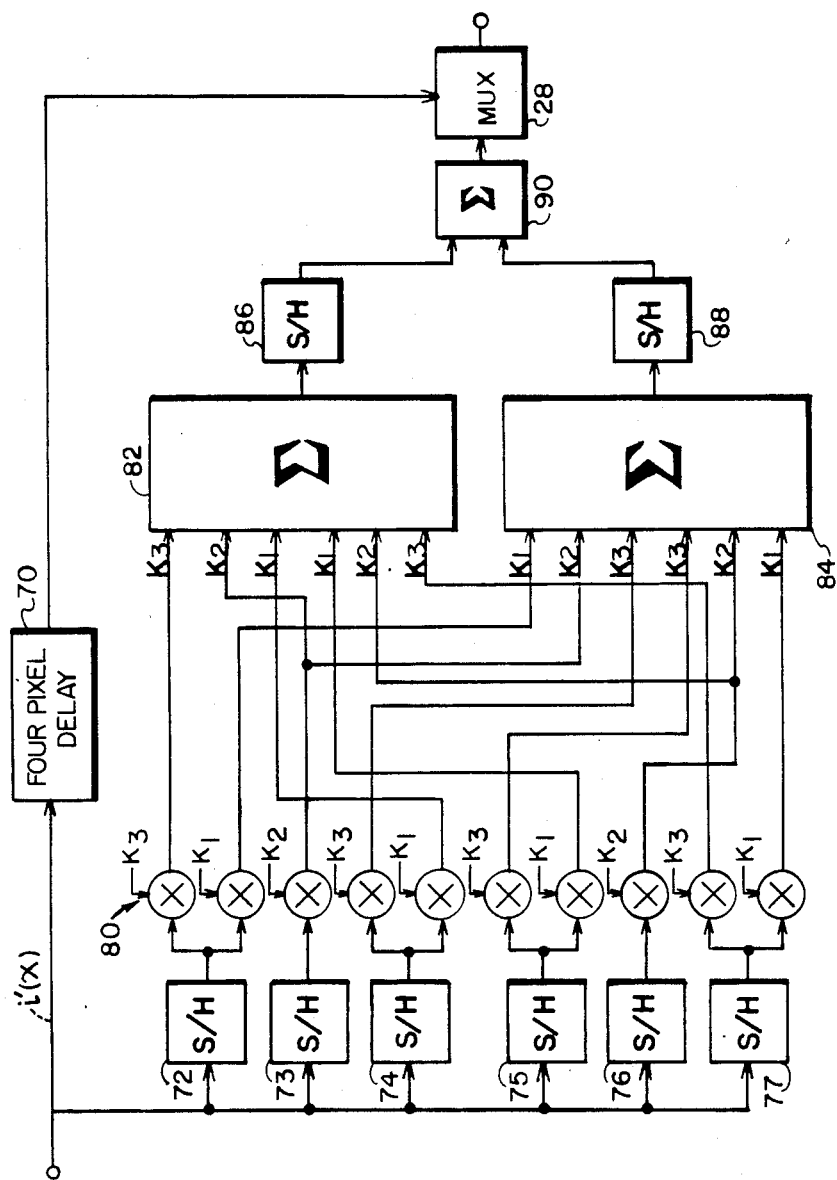
FIG. 6 is a schematic diagram of a finite impulse response (FIR) filter suitable for use as the digital filter shown as part of FIG. 3.

The diagram of the digital filter 34 shown in FIG. 3 is useful for understanding the invention. Handling a continuous stream of image signals, however, involves an arrangement of filter components such as shown by FIG. 6. The main reason for this different arrangement is that the filter intermittently modifies the image signal—that is, it replaces every fourth image sample (the non-green sample) though it applies all the other samples within its memory to calculate the replacement value. The coefficients $K_3 \ldots K_{-3}$ (see FIG. 3) involved in this operation have values depending on their "location" relative to the modified sample. The coefficients $K_1$ and $K_{-1}$ applied to the samples nearest the one to be modified have different values than the coefficents which are two or three times removed ($K_2$, $K_{-2}$ and $K_3$, $K_{-3}$). From one non-green sample to the next, therefore, the order of the coefficients must be reversed. (This only affects the coefficients $K_1$ and $K_3$, and $K_{-1}$ and $K_{-3}$ since reversing the order leaves the center coefficient unchanged.)

Turning now to FIG. 6, the input image signal i'(x) is simultaneously applied to a four-sample delay line 70 and to a set of six sample and hold circuits 72, 73, 74, 75, 76 and 77. Each sample and hold circuit holds a green sample for the duration of seven pixels. The sample and hold circuits are sequentially triggered (from top to bottom in FIG. 6) by the controller 32 (FIG. 3) in such a manner that they sequentially sample three green samples, then wait for the duration of one pixel (while the non-green sample passes) before sampling the next three green samples in sequence. In other words, the sample and hold circuits are cycled in sequence so that there is a waiting period of one pixel between sample and hold 74 and sample and hold 75 and between sample and hold 77 and sample and hold 72.

Each sampled image signal is then weighted by a respective filter coefficient. Note that the center coefficient $K_0$ is dropped since it is zero and the non-green sample is zeroed simply by ignoring it. It is also the case that the coefficients applied to samples on either side of the non-green sample are identical position-for-position (according to the preferred embodiment); therefore the "minus" subscripts are dispensed with and the coefficient values are shown by $K_1$, $K_2$ and $K_3$. The weightings occur by means of a network 80 of multiplier elements (a resistance network is one conventional way of doing this). The existence of two weightings on the output lines of sample and hold circuits 72, 74, 75 and 77 reflects, as hereinbefore explained, the periodic reversal of the coefficient order. This is done by the controller 32 (FIG. 3) and may involve, for example, the use of transistorized switching of the appropriate resistances.

The weighted image signal samples are provided to a pair of summing circuits 82 and 84 (each of which may, for example, be an operational amplifier set up as a multiple input summing amplifier). The summed values are stored by a pair of sample and hold circuits 86 and 88, which are connected to a summing circuit 90 for providing the final sum that will replace the non-green sample. The final sum is provided to the multiplexer 28.

Meanwhile the incoming image signal i'(x) has been delayed for a period of four pixels corresponding to four samples) in the delay line 70 and, upon emerging, is delivered to the multiplexer 28. The function of the multiplexer 28 is to pass every green image sample emerging from the delay line 70 and substitute the sum signal from the summing circuit 90 for every non-green image sample emerging from the delay line 70. This is done according to instructions from the controller 32 (FIG. 3).

The digital filter described according to the invention is a non-recursive or finite impulse response (FIR) filter based upon a finite number of terms. Two terms on either side of the estimated value $X_1$, i.e., $$G \ G \ X_1 \ G \ G$$

seem to be the minimum necessary for a useful estimate. It is obvious, however, that the number of terms may be expanded to cover any number desired. For example, with the preferred color filter, three terms on either side of the estimated term is used. With the same color filter, six terms on either side of the estimate value $X_1$, may also be used, i.e.

$$G \ G \ G \ X \ G \ G \ G \ X_1 \ G \ G \ G \ X \ G \ G \ G$$

The occurrence of additional non-green samples is not detrimental to this analysis (they are ignored). Four terms on either side of the estimated value $X_1$ using a filter as shown by FIG. 4(a), can also be used, i.e.

$$G \ G \ X \ G \ G \ X_1 \ G \ G \ X \ G \ G$$

However little benefit is apparently obtained for such added complexity.

The coefficients for the digital filter were obtained by a method of spatial domain (spread function) optimization. The coefficients may alternatively be obtained by a method of frequency domain optimization. According to the latter process, coefficients are selected which minimize the absolute value of the frequency response of the optical prefilter 16 (FIG. 3) multiplied by (1.0 minus the frequency response of the digital filter 34). This optimization is also done with the ENNIPEDE (or Simplex) routine. The benefit of the frequency domain optimization is that it adds another degree of freedom—the frequency. It is possible to limit the frequency range used in optimization as well as optimize the spatial domain (which the spread function optimization does). If, as is usual, the video system (including the digital filter) has an inherent upper frequency limit, a special set of coefficients can be obtained which provide an improved spread function optimization up to that upper frequency limit. This will be a different set of numbers than previously obtained and they will only be optimum up to that frequency. But nothing is lost at these frequencies since a higher frequency response is of no use to the overall system anyhow. This type of optimization is the preferred method and the coefficients obtained therefrom constitute the preferred coefficients.

The preferred birefringent filter of FIG. 5 has a discrete filter frequency response of $$B_0 + 2B_1 \cos 2\pi F \quad (3)$$

where $B_0$, $B_1$ are the coefficients of the spread function (i.e., $B_1$; $B_0$; $B_1$) and F is the spatial sampling frequency, which varies from 0 to $\frac{1}{2}$ cycle/pixel (Nyquist frequency). (Essentially this involves treating the three spot birefringent filter as a finite impulse response (FIR) filter). The discrete filter frequency response of the digital filter is $$A_0 + 2A_1 \cos 2\pi F + 2A_2 \cos 4\pi F + 2A_3 \cos 6\pi F \quad (4)$$

where $A_0 \ldots A_3$ are the filter coefficients. The object is to multiply the frequency response (3) of the birefringent filter with the frequency response (4) of the digital filter and obtain an approximation of the frequency response (3) of the birefringent filter. The coefficients obtained by frequency domain optimization are $$
\begin{aligned}
A_3 (= K_3) &= 0.149 \\
A_2 (= K_2) &= -0.483 \\
A_1 (= K_1) &= 0.834 \\
A_0 (= K_0) &= 0 \\
A_1 (= K_{-1}) &= 0.834 \\
A_2 (= K_{-2}) &= -0.483 \\
A_3 (= K_{-3}) &= 0.149
\end{aligned} \quad (5)
$$

These numbers were calculated without considering a lens in the system and assume a maximum frequency of 0.6 Nyquist frequency. (Note F=0.3 corresponds to 0.6 times the Nyquist frequency). The frequency responses of the birefringent filter and the digital filter may be multiplied with the frequency response of the lens in the optimization routine to yield a different set of "optimum" numbers. The frequency domain optimization produces an approximation of the spread function (1) of the birefringent filter, as follows (first line):

| 0.038 | −0.051 | 0.016 | 0.283 | 0.427 | 0.283 | 0.016 | −0.051 | 0.038 |
|---|---|---|---|---|---|---|---|---|
| 0 | 0 | 0 | 0.256 | 0.488 | 0.256 | 0 | 0 | 0 | which approximates the original point spread function (1) shown by the second line. This is a better approximation than that obtained by spatial domain optimization alone, at least within the frequency limit prescribed for this example. It is also noted that these optimization techniques fail if carried above about $\frac{3}{4}$ of the Nyquist frequency (based on the total member of red, green and blue samples). For that reason, optical prefiltering is a necessity.

Though optical prefiltering is necessary it may be done in a variety of ways. Besides any type of conventional optical filter, a lens with a known level of aberration can provide the necessary prefiltering all by itself. Also, a two sensor system can be set up to provide prefiltering without any auxiliary optical filtering. Referring to FIG. 7, one sensor 100 has a pattern of all-green receptors (an all-green filter overlying the sensor) and the other sensor 102 has green receptors separating vertically-alternating red and blue receptors. The photosites defining each receptor are separated by one-half the width (W) of a photosite. A signal brought out, for example, from the first line of both sensors and interleaved with relation to time will have the following form:

$$G_1 \, G'_1 \, G_2 \, R_1 \, G_3 \, G'_2 \, G_4 \, R_2 \ldots$$

Besides being of a form useful for practicing the invention, the green light that would coincide with the red receptor $R_1$ has been spread (i.e., filtered) over both green receptors $G_2$ and $G_3$. With a dual sensor of this type the benefits of a high resolution single sensor can be obtained with two relatively coarse resolution sensors.

The invention has been described in detail with particular reference to a presently preferred embodiment, but it will be understood that variations and modifications can be effected within the spirit and scope of the invention.

ATTACHED APPENDIX

```
C         ENNIPEDE
C                     THIS ROUTINE MINIMIZES!

IMPLICIT REAL*8 (A-H,O-Z)
          REAL*8 P(21),TP(20),CENT(20),S(20)
          INTEGER BELL
          DATA BELL/0/
          CHARACTER*1 ANS
          COMMON /NUMS/ FEXG,FSH,FEX
          COMMON /PEDE/ E(20,21)
          COMMON /FLAGS/ LUND
          DATA LUND/6/

DATA FEX/1.60D0/FSH/.50D0/MAXD/20/

CALL LIB$ERASE_PAGE(1,1)

904       TYPE *,'Number of dimensions in problem?'
          ACCEPT *,ND
          NLINE=(ND+3)/4
          IF(ND .GT. MAXD)THEN
             TYPE *,
     &       'SORRY, DIMENSIONS TOO GREAT FOR CURRENT VERSION OF ENNIPEDE'
             GO TO 904
```

```
              ENDIF

NL=ND+1

FEXG=FEXCOR(FEX,NL)

TYPE *,'Show ennipede after every ? moves'
              ACCEPT *,IMOVE

901           WRITE(6,1)
              ACCEPT *,(S(J),J=1,ND)
              X=PERF(S,ND)
              TYPE *,'INITIAL GUESS PERFORMANCE = ',X

902           DO 100 J=1,NL
              CALL COPY(S,E(1,J),ND)
              IF(J .LE. ND)E(J,J)=S(J)+0.10D0
100           P(J)=PERF(E(1,J),ND)
              NTOT=0

CALL TROID(ND,NL,CENT)
              CALL SIZE(ND,NL,CENT,SIZ)
              CALL ORDER(ND,NL,P)
              TYPE *,'INITIAL CONDITIONS:'
              CALL SHOW(ND,NL,P,NTOT,SIZ)
900           WRITE(6,9)BELL
              READ(5,5)ANS
              CALL UPPER(ANS)

IF(ANS .EQ. 'M')THEN
                    TYPE *,'Number of moves?'
                    ACCEPT *,NMOVES
                    GO TO 903
              ENDIF IF(ANS .EQ. 'F')THEN
                    WRITE(6,6)FEX,FSH
                    ACCEPT *,FEX,FSH
                    FEXG=FEXCOR(FEX,NL)
                    GO TO 900
              ENDIF

IF(ANS .EQ. 'Q')CALL EXIT

IF(ANS .EQ. 'S')THEN
                    TYPE *,'Show ennipede after every ? moves'
                    ACCEPT *,IMOVE
                    GO TO 900
              ENDIF IF(ANS .EQ. 'R')THEN
                    CALL ORDER(ND,NL,P)
                    CALL COPY(E(1,NL),S,ND)
                    GO TO 902
              ENDIF

IF(ANS .EQ. 'G')GO TO 901

GO TO 900

903           NSHR=0

DO 101 I=1,NMOVES
```

```
            CALL ORDER(ND,NL,P)
            IF(IMOVE .GT. 0 .AND. I .GT. 1)THEN
                  IF(MOD((I-1),IMOVE).EQ. 0)THEN
                        CALL SHOW(ND,NL,P,NTOT,SIZ)
                  ENDIF
            ENDIF

NFAIL=0

IF(SIZ .LT. 0.0001D0)THEN
                  WRITE(6,8)NTOT
                  GO TO 103
            ENDIF
            NTOT=NTOT+1
            DO 102 L=1,NL
            CALL MOVE(E(1,L),CENT,ND,TP,FEXG)
            TPERF=PERF(TP,ND)
            IF(TPERF .LT. P(L))THEN
                  CALL MOVCEN(CENT,E(1,L),TP,NL,ND)
                  CALL COPY(TP,E(1,L),ND)
                  P(L)=TPERF
            ELSE
                  NFAIL=NFAIL+1
                  IF(NFAIL .GE. NL)THEN
                       CALL SHRINK(ND,NL,P)
                       NSHR=NSHR+1
                       CALL TROID(ND,NL,CENT)
                       GO TO 101
                  ENDIF
            ENDIF

102         CONTINUE
            CALL SIZE(ND,NL,CENT,SIZ)
101         CONTINUE

103         CALL ORDER(ND,NL,P)

WRITE(6,2)P(NL),(E(J,NL),J=1,ND)
            WRITE(6,3)NSHR
            WRITE(6,4)SIZ

GO TO 900

1           FORMAT(///' Initial guess?   ',$)
2           FORMAT(/' BEST PERF = ',F20.10,' AT:',
     &         <NLINE>(/,3X,4F19.10,:))
3           FORMAT(' NUMBER OF SHRINKS = ',I5)
4           FORMAT('  SIZE = ',F20.10)
5           FORMAT(A1)
6           FORMAT(' CURRENT FEX =',F10.4,5X,'FSH = ',F10.4,5X,
     &             'NEW? ',$)
7           FORMAT('    CENT: ',<ND>F20.10,/)
8           FORMAT(//' *SHRUNK UP* AFTER MOVE ',I5)
9           FORMAT(//' WHAT NEXT? (Move, Guess, Factors, Rebuild,',
     &         ' Show, Quit)   ',
     &              A1,$)
10          FORMAT(1X,/,'1')
            END
```

```
C       ********************************************************************
        SUBROUTINE COPY(A, B, ND)
C       ********************************************************************
        IMPLICIT REAL*8 (A-H, O-Z)

REAL*8 A(ND), B(ND)

DO 100 I=1, ND
100     B(I)=A(I)

RETURN
        END

C       ********************************************************************
        SUBROUTINE TROID(ND, NL, CENT)
C       ********************************************************************
        IMPLICIT REAL*8 (A-H, O-Z)

REAL*8 CENT(ND)
        COMMON /PEDE/ E(20, 21)

DO 101 I=1, ND
        SUM=0.0D0

DO 100 J=1, NL
100     SUM=SUM+E(I, J)

101     CENT(I)=SUM/DFLOAT(NL)

RETURN
        END

C       ********************************************************************
        SUBROUTINE MOVE(A, B, N, C, F)
C       ********************************************************************
        IMPLICIT REAL*8 (A-H, O-Z)

REAL*8 A(N), B(N), C(N)

G=1.0D0 + F

DO 100 I=1, N
100     C(I)=G*B(I) - F*A(I)

RETURN
        END
        ********************************************************************
        SUBROUTINE SHRINK(ND, NL, P)
C       ********************************************************************
        IMPLICIT REAL*8 (A-H, O-Z)

REAL*8 P(NL)
        COMMON /NUMS/ FEXG, FSH, FEX
        COMMON /PEDE/ E(20, 21)
        COMMON /FLAGS/ LUND

CALL BEST(ND, NL, P)

DO 100 J=1, NL-1
        CALL MOVE(E(1, J), E(1, NL), ND, E(1, J), -FSH)
100     P(J)=PERF(E(1, J), ND)
```

```
          RETURN
          END

C         ****************************************************************
          SUBROUTINE ORDER(ND,NL,P)
C         ****************************************************************
          IMPLICIT REAL*8 (A-H,O-Z)

REAL*8 P(NL)
          COMMON /PEDE/ E(20,21)

DO 100 I=1,NL-1
          ML=NL-I+1
100       CALL BEST(ND,ML,P)

RETURN
          END

C         ****************************************************************
          SUBROUTINE BEST(N,L,P)
C         ****************************************************************
          IMPLICIT REAL*8 (A-H,O-Z)

REAL*8 P(L)
          COMMON /PEDE/ E(20,21)

CALL TOP(L,P,J)
          IF(J.EQ.L)GO TO 100
          CALL FLOP(E(1,L),E(1,J),N)
          CALL SWAP(P(L),P(J))

100       RETURN
          END
          ****************************************************************
          SUBROUTINE TOP(N,P,J)
          ****************************************************************
          IMPLICIT REAL*8 (A-H,O-Z)

REAL*8 P(N)

J=1
          IF(N.LE.1) GO TO 101

T=P(1)
          DO 100 I=2,N
          IF(P(I).LT. T) THEN
               T=P(I)
               J=I
          ENDIF
100       CONTINUE

101       RETURN
          END

C         ****************************************************************
          SUBROUTINE SWAP(A,B)
C         ****************************************************************
          IMPLICIT REAL*8 (A-H,O-Z)

R=A
          A=B
          B=R
          RETURN
          END
```

```
C       ****************************************************************
        SUBROUTINE FLOP(A,B,N)
C       ****************************************************************
        IMPLICIT REAL*8 (A-H,O-Z)

REAL*8 A(N),B(N)

DO 100 I=1,N
100     CALL SWAP(A(I),B(I))

RETURN
        END
C       ****************************************************************
        SUBROUTINE SHOW(ND,NL,P,NTOT,SIZ)
C       ****************************************************************
        IMPLICIT REAL*8 (A-H,O-Z)

COMMON /PEDE/ E(20,21)
        REAL*8 P(NL)

NLINE=(ND+3)/4
        WRITE(6,4)NTOT
        DO 100 J=1,NL
100     WRITE(6,1)J,P(J),(E(I,J),I=1,ND)

WRITE(6,3)SIZ

RETURN

1       FORMAT(' LEG ',I3,':   PERF = ',F20.10,
     &          <NLINE>(/,3X,4F19.10,:))
3       FORMAT( ' SIZE = ',F20.10)
4       FORMAT(/' MOVE ',I5,' CURRENT ENNIPEDE:'/)
        END

C       ****************************************************************
        SUBROUTINE SIZE(ND,NL,CENT,S)
C       ****************************************************************
        IMPLICIT REAL*8 (A-H,O-Z)

COMMON /PEDE/ E(20,21)
        REAL*8 CENT(ND)

S=0.0D0
        DO 101 I=1,ND
        SUM=0.0D0
        DO 100 J=1,NL
100     SUM=SUM+(E(I,J)-CENT(I))**2

101     S=S+SQRT(SUM)

S=S/DFLOAT(ND)

RETURN
        END
        ****************************************************************
        FUNCTION FEXCOR(F,N)
        ****************************************************************
        IMPLICIT REAL*8 (A-H,O-Z)

FEXCOR = (DFLOAT(N) * F + 1.0D0) / (DFLOAT(N) - 1.0D0)

RETURN
        END
```

```
C     ***********************************************************
      SUBROUTINE MOVCEN(C,E,T,NL,ND)
C     ***********************************************************
      IMPLICIT REAL*8 (A-H,O-Z)

REAL*8 C(ND),E(ND),T(ND)
      COMMON /FLAGS/ LUND

F=DFLOAT(NL) / (1.D0 - DFLOAT(NL))
      CALL MOVE(C,E,ND,C,F)

F=1.D0/F
      CALL MOVE(C,T,ND,C,F)

RETURN
 7    FORMAT(' CENT:  ',<ND>F20.10,/)
      END
```

What is claimed is:

1. Video apparatus for converting light from an image into an electrical signal and for processing the electrical signal, comprising:

sensing means for generating the electrical signal from a blurred likeness of the image light;

color filter means for partially blocking light of a particular color from activating said sensing means; and electrical filter means for processing the electrical signal according to a set of weighting coefficients that are selected so as to generate a filtered signal representative of the brightness distribution of said light of said particular color that is blocked by said color filter means.

2. Apparatus as claimed in claim 1 in which said sensing means comprises:

a sensor for generating a light-induced signal corresponding to the brightness of the image light striking said sensor; and an optical filter for blurring the light directed to said sensor.

3. Apparatus as claimed in claim 2 in which said color filter means comprises a color filter interposed between said optical filter and said sensor.

4. Apparatus as claimed in claim 3 in which said color filter has a pattern of filter elements, some elements blocking light of said particular color from striking said sensor and other elements allowing light of said particular color to strike said sensor.

5. Apparatus as claimed in claim 4 in which the elements blocking light of said particular color comprise a majority of said filter elements.

6. Apparatus as claimed in claim 4 in which the elements blocking light of said particular color comprise approximately seventy-five percent of said filter elements.

7. Apparatus as claimed in claim 1 in which said sensing means comprises:

a pair of sensors comprised of photosites for generating a pair of light-induced signals corresponding to the brightness of the image light striking said photosites, one sensor offset from the other sensor by one-half the width of a photosite; and means for interleaving the pair of light-induced signals to form the electrical signal of which the signal segments derived from said sensor photosites are in sequential time relation and represent a blurred likeness of the image light.

8. Apparatus as claimed in claim 7 in which said color filter means comprises:

respective color filters, positioned in the path of the light striking said sensors, for selectively passing light of said particular color, one color filter passing only light of said particular color to one said sensor and the other color filter having a pattern that periodically blocks light of said particular color from reaching said other sensor.

9. Video apparatus for converting light into an electrical signal and for processing the electrical signal, comprising:

a sensor for generating the electrical signal corresponding to the brightness of light striking said sensor;

an optical filter for blurring the light directed to said sensor according to a known response function;

a color filter, interposed between said optical filter and said sensor, said color filter having a plurality of filter elements that pass certain colors and block others, the elements being so arranged along one dimension that an element blocking a selected color is surrounded by at least four elements, two on either side thereof, that pass said selected color;

means for sampling the electrical signal;

filter means for generating a filtered signal from a linear combination of samples from a string thereof corresponding to said at least four elements surrounding said filter element blocking said selected color, the samples being weighted according to a set of coefficients that are selected in a process that substantially equates them to the response function of said optical filter; and means for substituting the filtered signal for that portion of the electrical signal corresponding to the filter element blocking said selected color.

10. Apparatus as claimed in claim 9 in which the known response function of said optical filter is a spatial function and said filter means is constituted by a set of coefficients so selected that the convolution of the coefficients with the spatial function of said optical filter yields a close approximation of the spatial function of said optical filter.

11. Apparatus as claimed in claim 9 in which the known response of said optical filter is a frequency response and said filter means has a frequency response so selected that the filter frequency response multiplied by the optical filter frequency response yields a close approximation of the optical filter frequency response.

12. A video camera of the type that generates a signal corresponding to selected light of a particular color received from areas of a scene, said camera comprising:
- an image sensor having a plurality of photosites corresponding spatially to areas of the scene;
- an optical filter that spreads light from each scene area over a region occupied by several photosites according to known spatial and frequency response functions;
- a spectrally-selective filter interposed between said image sensor and said optical filter, said spectrally-selective filter having one type of filter element that blocks the selected light and another type of filter element that passes the selected light;
- means for generating an image signal corresponding to the selected light striking said image sensor, said signal comprising periods during which the selected light is not received on said sensor and other periods during which the selected light is received through the light-passing filter elements;
- a digital filter characterized by a set of weighting coefficients capable of approximately reconstructing the spatial response function of said optical filter when convolved therewith or the frequency response function when multiplied therewith;
- means for applying the image signal to said digital filter and for obtaining a filtered signal therefrom; and
- means for substituting said filtered signal for the signal periods during which the selected light is not received.

13. A color video camera of the type that generates a signal corresponding to colored light received from areas of the scene, said camera comprising:
- an image sensor having a plurality of photosites corresponding spatially to areas of the scene;
- an optical filter that spreads light received from each scene area over a sensor region occupied by several photosites according to a known response function;
- a color selective filter interposed between said image sensor and said optical filter, said color filter having one type of filter element that blocks light of a selected color and another type of filter element that passes light of said selected color;
- means for generating an image signal corresponding to light striking said image sensor, said signal comprising a sequence of samples corresponding to the light striking discrete photosites, including photosites for which said color filter blocks light of the selected color;
- means for filtering said image signal by generating a filtered signal from a linear combination of the image samples and weighting each sample according to a function that approximates the effect of the optical filter response function upon the scene; and
- means for substituting the filtered signal for the image signal during sample periods for which said color filter blocks light of the selected color.

14. A single sensor color video camera of the type that generates a luminance signal from the green information in a scene and a color signal from a combination of the green information with other color information in the scene, said camera comprising:
- an optical filter that generates a blurred image of the scene according to known spatial and frequency characteristics;
- a color filter having at least twice as many green filter elements as non-green filter elements, said color filter elements forming a line pattern in which substantially all non-green filter elements are separated by at least two green filter elements;
- an image sensor having photosensitive image sites that correspond spatially to said filter elements;
- means for so arranging said color filter between said optical filter and said image sensor that green light spatially corresponding to a non-green filter element is blurred and spread over several filter elements, said several filter elements including a non-green filter element and a green element on either side thereof;
- means for recovering an image signal from said image sensor; and
- an electrical filter for processing said image signal, said filter comprising means for assembling a linear combination of weighted samples of said image signal, said linear combination being weighted according to a set of coefficients so selected that the convolution of the spatial characteristic of said optical filter with the spatial characteristic of said electrical filter, or the multiplication of the frequency characteristic of said optical filter with the frequency characteristic of said electrical filter, approximately reproduces the corresponding spatial or frequency characteristic of said optical filter.

15. A single sensor color video camera as claimed in claim 14 in which said color filter elements form a line pattern in which substantially all non-green filter elements are separated by three green filter elements and in which said green light spatially corresponding to a non-green filter element is blurred and spread over a non-green element and at least one green element on either side thereof.

16. A single sensor color video camera as claimed in claim 14 in which said optical filter is a birefringent filter that separates at least the green light spatially corresponding to a non-green filter element into three separate green rays that strike said non-green filter element and a green element on either side thereof.

17. A digital filter for use with a color video system in which a color selective signal representative of areas of a scene is generated by the combination of:
- an optical filter for blurring light received from the scene according to a known spread function;
- an image sensor having many photosites for generating a discrete set of signals from the blurred light; and
- a color filter interposed between the optical filter and the image sensor, said color filter having an array of filter elements permitting light of a particular color to strike a majority of photosites of the image sensor and blocking said colored light from a minority of photosites;

said digital filter characterized by means for generating a linear combination of said discrete signals according to a set of weighting coefficients applied to said signals, the weighting coefficients selected so that said known spread function is substantially replicated when said selected coefficients are convolved with said known spread function.

* * * * *